Figure 1:
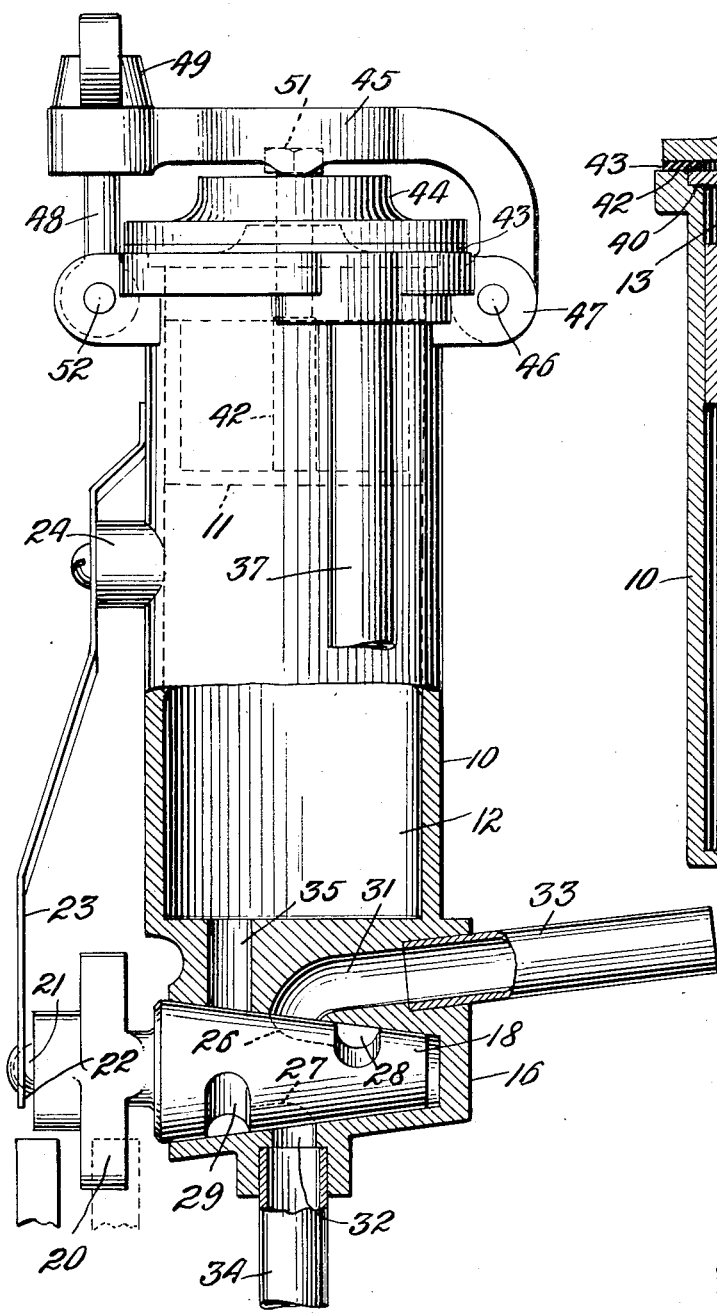

Jan. 30, 1934.  W. PAGE ET AL  1,945,290

SEALING MEANS FOR CAN FILLING UNITS

Filed July 16, 1932

INVENTORS
WALTER PAGE
JOHN M. McCLATCHIE
BY
English & Studwell
ATTORNEYS

Patented Jan. 30, 1934

1,945,290

UNITED STATES PATENT OFFICE 1,945,290

SEALING MEANS FOR CAN FILLING UNITS

Walter Page, Scarsdale, and John M. McClatchie, New York, N. Y., assignors to The Borden Company, New York, N. Y., a corporation of New Jersey Application July 16, 1932. Serial No. 622,876

3 Claims. (Cl. 221—103)

This invention relates to a means for sealing the filling units of a can filling machine of the type shown in the patent to Dickerson No. 1,365,773, dated January 18, 1921. In the type of filling unit shown in that patent, a floating partition or piston is movable within a cylinder within which liquid is received and from which predetermined quantities of the liquid are discharged. The stroke of the piston in one direction is limited by the bottom wall of the cylinder, while its movement in an opposite direction is limited by an adjustable stop mounted in a cover or cap which closes the end of the cylinder. Since the quantity of liquid to be measured by the filling unit must be regulated with extreme accuracy, the adjustable stop governing the range of movement of the piston must be accurately set and maintained in a fixed position of adjustment. In the structure of the Dickerson patent, the cover member in which the adjustable stop for the piston is mounted, has a gasket interposed between it and the upper end of the cylinder for the purpose of producing a liquid-tight joint. When the gasket loses some of its resiliency through age or long use, and it becomes necessary to tighten down the cover to further compress the gasket, this tends to change the adjustment of the piston stop, since compression of the gasket tends to project the stop further down into the cylinder with the result that the range of movement of the piston within the cylinder is shortened and the amount of liquid measured by the filling unit is then lessened. The same is true when a new gasket of less thickness than that which preceded it, is used.

The object of this invention is to provide a sealing means for a filling unit of the type described, wherein the sealing gasket is so located relative to the closure cap which carries the stop, that gaskets of different thicknesses may be used or a gasket may be compressed to any required extent to maintain a liquid-tight seal between the cylinder and cap, without in any way affecting the position of the stop relative to the piston.

Specifically, the invention proposes the provision of a seat in the upper flanged end of the cylinder, on which the cap carrying the stop is received, and the placement of a sealing gasket over the joint between the cylinder and cap, the gasket being compressed and held down by means of a supplemental cap which can be pressed down upon the gasket with any required degree of force to close the end of the cylinder with a liquid-tight joint.

Figure 2:
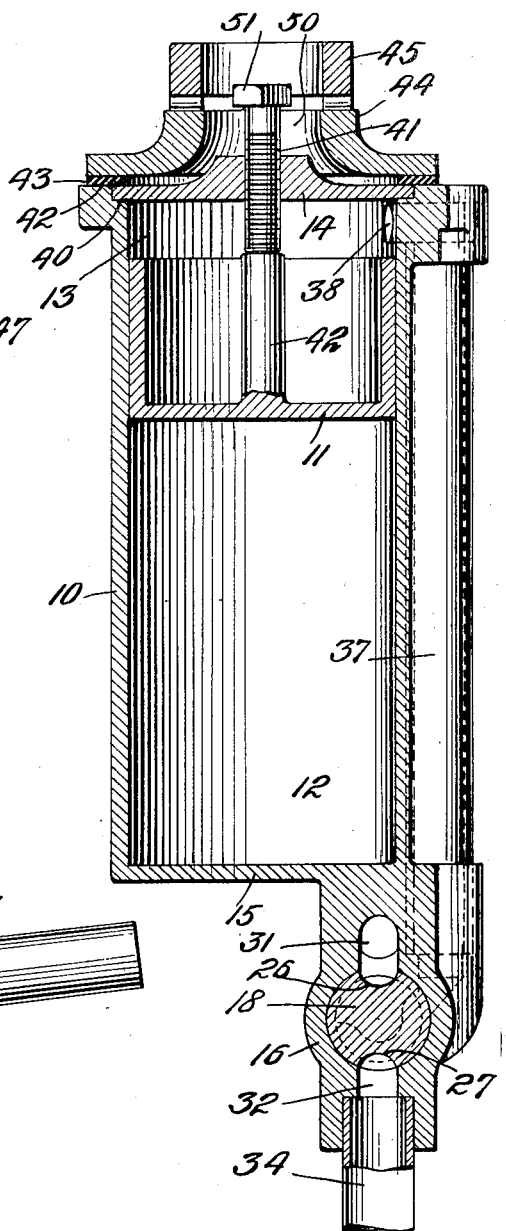

In the accompanying drawing illustrating the preferred form of the invention, Fig. 1 is a side elevation, partly in section, of a can filling unit of the machine of the Dickerson patent, showing the application of the improved sealing means thereto; and Fig. 2 is a vertical section through the structure of Fig. 1, taken at substantially right angles thereto.

The can filling unit to which the improved sealing means is applied is one of a series of such units, as shown and described in the said Dickerson patent. Each unit comprises a vertically arranged cylinder 10 having therein a floating partition or piston 11 which divides the cylinder into a lower chamber 12 and an upper chamber 13. The cylinder 10 is closed at its top by a cover 14 which rests on an annular seat 40 formed in the upper flanged end of the cylinder. At its lower end, the cylinder is closed by the bottom wall 15. Projecting downwardly from one side of the lower end of the cylinder 10 is a valve casing 16 in which is mounted a reversing valve 18. The head 20 of the valve is provided with a boss 21 against which presses the free end 22 of a leaf spring 23 pivotally mounted at its upper end on a lug 24 and acting to hold the valve in place in the casing 16.

The valve 18 is provided with grooves 26 and 27, the groove 26 communicating with a segmental transverse groove 28 in the valve and the groove 27 communicating with a segmental transverse groove 29. The grooves 26 and 27 register alternately with an inlet port 31 and an outlet port 32 formed in the casing 16. The inlet port 31 communicates with a feed tube 33 for the milk or other liquid, and the outlet port 32 communicates with a discharge tube 34. The milk or other liquid is fed into and discharged from the lower chamber 12 through a port 35 formed in the casing 16 and which leads from the chamber to the valve 18 in alinement with the groove 29 formed therein. The milk is fed into and discharged from the upper chamber 13 through a port formed in the casing 16 in alinement with the groove 28 in the valve 18 and leading from the valve seat into a vertically arranged tube 37 opening at 38 into the upper end of the chamber 13.

When the valve is in the position shown in Fig. 1, milk or other liquid is being fed into the upper chamber 13, while the lower chamber is discharging its contents out through the pipe or tube 34. When the valve 18 is moved through an angle of 180° milk is fed into the lower chamber 12 while the upper chamber 13 is discharging its contents.

The upward movement of the piston 11 is regulated by the setting of an adjustable stop 41 in the form of a screw which is threaded through the cover 14 to a required extent. Located within the piston 11 is an upright stud 42, which strikes against the end of the stop 41 when the piston reaches its limit of upward movement. The cover 14 is, near its peripheral edge, of substantially the same thickness as the depth of the seat 40 so that the upper face of the cover at its edge and the upper face 42 of the cylinder flange form a surface upon which a sealing gasket 43 is received. The gasket is compressed to seal the joint between the cap 14 and the cylinder, by means of an auxiliary or supplemental cap 44 which is clamped down on top of the gasket by a yoke 45 pivoted at 46 in lugs 47 projecting from the cylinder. The free end of the yoke 45 receives a bolt 48 hinged at 52 and threaded to receive a clamping nut 49 whereby sufficient clamping pressure may be imposed upon the cap 44 to compress the gasket 43 to the required extent to insure a liquid-tight joint between the cylinder and cap 14. The cap 44 is formed with a central aperture 50 through which access to the head or end 51 of the stop 41 may be had to adjust the stop without requiring the removal of the cap 44.

With the construction described, it will be seen that removal, replacement or adjustment of the sealing gasket in no way affects the position of the cover 40 or the position of the stop 41 relative to the cylinder so that the amounts of liquid discharged from the filling unit are constant once the stop 41 is accurately set.

What we claim is:—

1. In an apparatus of the character described, a cylinder, a piston movable therein, a seat provided at one end of the cylinder, a cover closing the end of the cylinder and resting on the seat, an adjustable stop on the cover projecting into the cylinder to form an abutment for the piston, a sealing gasket resting on the end of the cylinder and closing the joint between the seat thereon and the cover resting on said seat, a cap resting on the gasket and means for clamping the cap against the gasket to compress the same.

2. In a can filling unit, a cylinder having an annular recess formed in its end, a cover having its edge portion seated in the recess and its outer face flush with the end of the cylinder, an adjustable stop in the cover, a sealing gasket resting on the end of the cylinder and on the outer face of the portion of the cover located adjacent to the end of the cylinder, a cap resting on the gasket and provided with an aperture through which the adjustable stop is accessible, and means for clamping the cap down on the gasket.

3. In a can filling unit, a cylinder, a piston movable therein, a flanged end formed on the cylinder, the cylinder having an annular recess located in said flanged end and forming a seat, a cover having its marginal edge portion resting upon the seat, an adjustable stop threaded through the cover and projecting into the cylinder, a gasket compressed against the flanged end of the cylinder and the outside face of the cover and positioned to overlie the joint between the edge of the cover and the seat, a cap located over the cover and gasket, the cap having an aperture into which a part of the adjustable stop extends, and means for clamping the cap against the gasket to close the end of the cylinder with a liquid-tight joint without shifting the cover relative to the cylinder.

WALTER PAGE.
JOHN M. McCLATCHIE.